United States Patent [19]
Sayers

[11] Patent Number: 4,958,142
[45] Date of Patent: Sep. 18, 1990

[54] VEHICLE THEFT DETERRENT

[76] Inventor: Carol L. Sayers, Glengarry, Miowera Road, North Turramurra NSW, Australia, 2074

[21] Appl. No.: 363,517
[22] PCT Filed: Nov. 18, 1988
[86] PCT No.: PCT/AU88/00450
§ 371 Date: May 15, 1989
§ 102(e) Date: May 15, 1989
[87] PCT Pub. No.: WO89/05018
PCT Pub. Date: Jun. 1, 1989

[30] Foreign Application Priority Data
Nov. 20, 1987 [AU] Australia ............................ 15534/87

[51] Int. Cl.$^5$ ............................................. B60R 25/10
[52] U.S. Cl. .................................... 340/426; 340/568; 307/10.2
[58] Field of Search ............... 340/426, 428, 407, 568; 116/33, 83, 87, 214; 109/20, 29, 31, 32; 307/10.2; 180/287

[56] References Cited

U.S. PATENT DOCUMENTS

| | | | |
|---|---|---|---|
| 4,068,780 | 1/1978 | Fegley | 109/20 X |
| 4,222,032 | 9/1980 | Speer | 340/426 |
| 4,679,026 | 7/1987 | Knakowski et al. | 340/426 |
| 4,698,620 | 10/1987 | Marshall | 116/214 X |
| 4,758,817 | 7/1988 | Akiyama | 340/568 X |
| 4,837,835 | 6/1989 | Murayama | 340/568 X |
| 4,841,752 | 6/1989 | Fletcher | 109/20 |

FOREIGN PATENT DOCUMENTS

| | | |
|---|---|---|
| 2442548 | 3/1976 | Fed. Rep. of Germany . |
| 2603700 | 8/1977 | Fed. Rep. of Germany . |
| 3446815 | 7/1986 | Fed. Rep. of Germany ...... 340/426 |
| 3517134 | 11/1986 | Fed. Rep. of Germany . |
| 2389951 | 12/1978 | France . |
| 8216179 | 3/1984 | France . |
| 2596554 | 10/1987 | France ................. 340/426 |

*Primary Examiner*—Joseph A. Orsino
*Assistant Examiner*—Brian R. Tumm
*Attorney, Agent, or Firm*—Jerry T. Kearns

[57] ABSTRACT

A motor vehicle theft deterrent device comprises a timer (2) operable by an existing alarm system (1), a relay (3) actuable in response to the timer (2), and a valve (14) operable, via the relay (3), to release and direct, through one or more concealed nozzles (4), a spray of a pressurized, non-toxic and non-corrosive irritant towards a would-be thief. The circuitry (12) and a pressurized container (9) may be accommodated in a tamper-proof metal housing (7) mounted upon the firewall of the vehicle, and a secondary circuit (5) may be activated so as to cause a siren or loudspeaker (6) to emit a high-pitched sound.

7 Claims, 3 Drawing Sheets

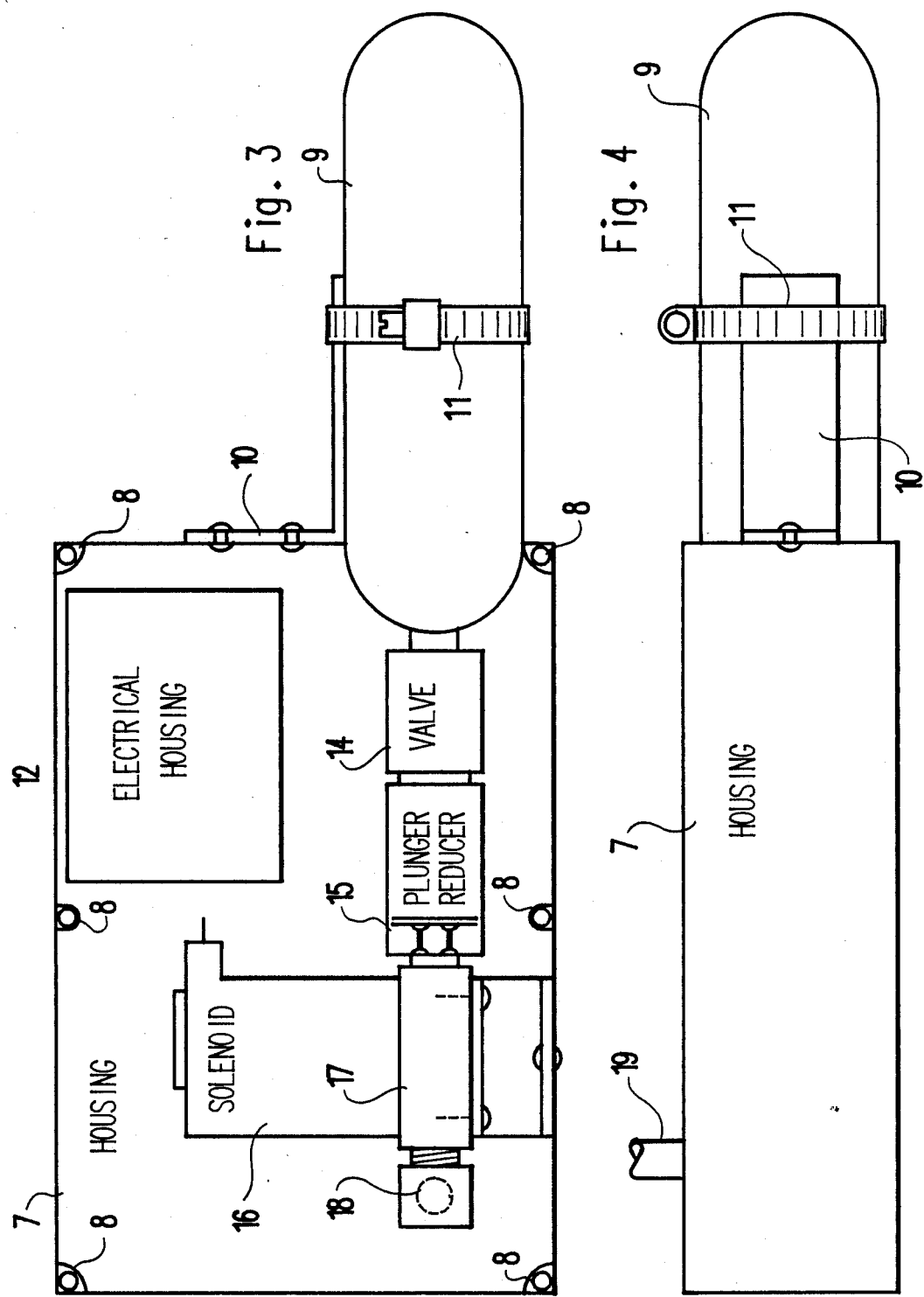

VEHICLE THEFT DETERRENT

TECHNICAL FIELD

This invention relates to vehicle theft deterrents and more particularly to an addition or adjunct to an existing vehicle anti-theft alarm system.

BACKGROUND ART

Motor vehicle theft is an ever-growing problem today and one which results not only in considerable cost and dismay to a stolen vehicle's owner but, in the long term, one which results in higher costs to all holders of vehicle insurance policies and, indeed, to all policy holders in general.

Various devices and systems using discomfort-causing substances have been proposed, one such being disclosed, for example, in the specification relating to PCT Application No. PCT/FR85/00244 of Sept. 10, 1985. In this document, a device using an existing windscreen washer element or elements of a motor vehicle to generate sprays of showers of "chemical liquids such as ammonia, sulphuric acid, and hydrochloric acid, and dyes ——" is installed in a vehicle, apparently with the aim of "— marking, hurting, asphyxiating —" a would-be thief.

DISCLOSURE OF INVENTION

However, as it is unlawful to injure seriously even a potential car thief — as with corrosive acids — it is an object of the present invention to overcome the above and other disadvantages by the provision of a motor vehicle theft deterrent device which may comprise a timer capable of being operated by an existing vehicle alarm; a relay actuable in response to the timer; and valve means operable, via the said relay, to release a spray of a pressurised, irritant and/or discomfort-causing substance towards a person unlawfully attempting to start the vehicle or to steal items therefrom.

The valve means may well be a plunger valve adapted to release the substance from a pressurised container such as a cylinder. The substance itself may be a gas or liquid capable of irritating the respiratory system, or the eyes, or both; the substance, however, must be non-toxic and non-corrosive. There again, the substance may be, or include, an indelible dyestuff.

Advantageously, the circuitry and the pressurised container or containers are accommodated in a tamper-proof metal housing mounted, say, upon the firewall of the vehicle.

Ideally, the pressurised substance is discharged through one or more concealed nozzles positioned so as to direct the spray or sprays towards the said unlawfully-acting person.

The timer may well be a two-stage circuit timer adapted to activate a secondary circuit to thereby cause a loudspeaker to emit a high-pitched sound painful to the human ear.

BRIEF DESCRIPTION OF DRAWINGS

In order that the reader may gain a better understanding of the present invention, hereinafter will be described a preferred embodiment thereof, by way of example only and with reference to the accompanying drawings in which:

FIG. 3 shows, somewhat schematically, a typical layout of the housing;, and

FIG. 4 is a corresponding top view.

BEST MODE FOR CARRYING OUT THE INVENTION

Figure 1:
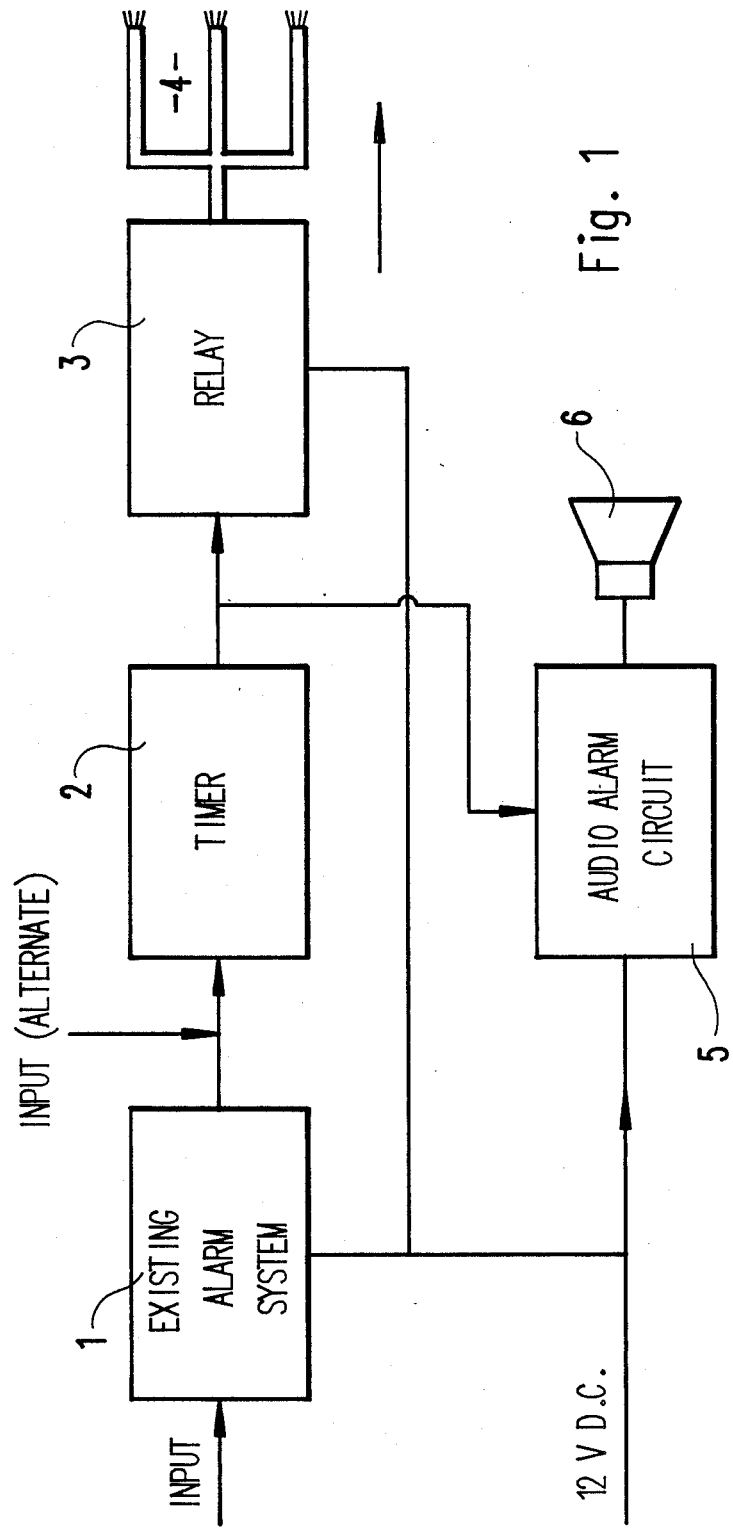
FIG. 1 is a simplistic block diagram which shows the interrelationship of the various features of the invention.
Figure 2:
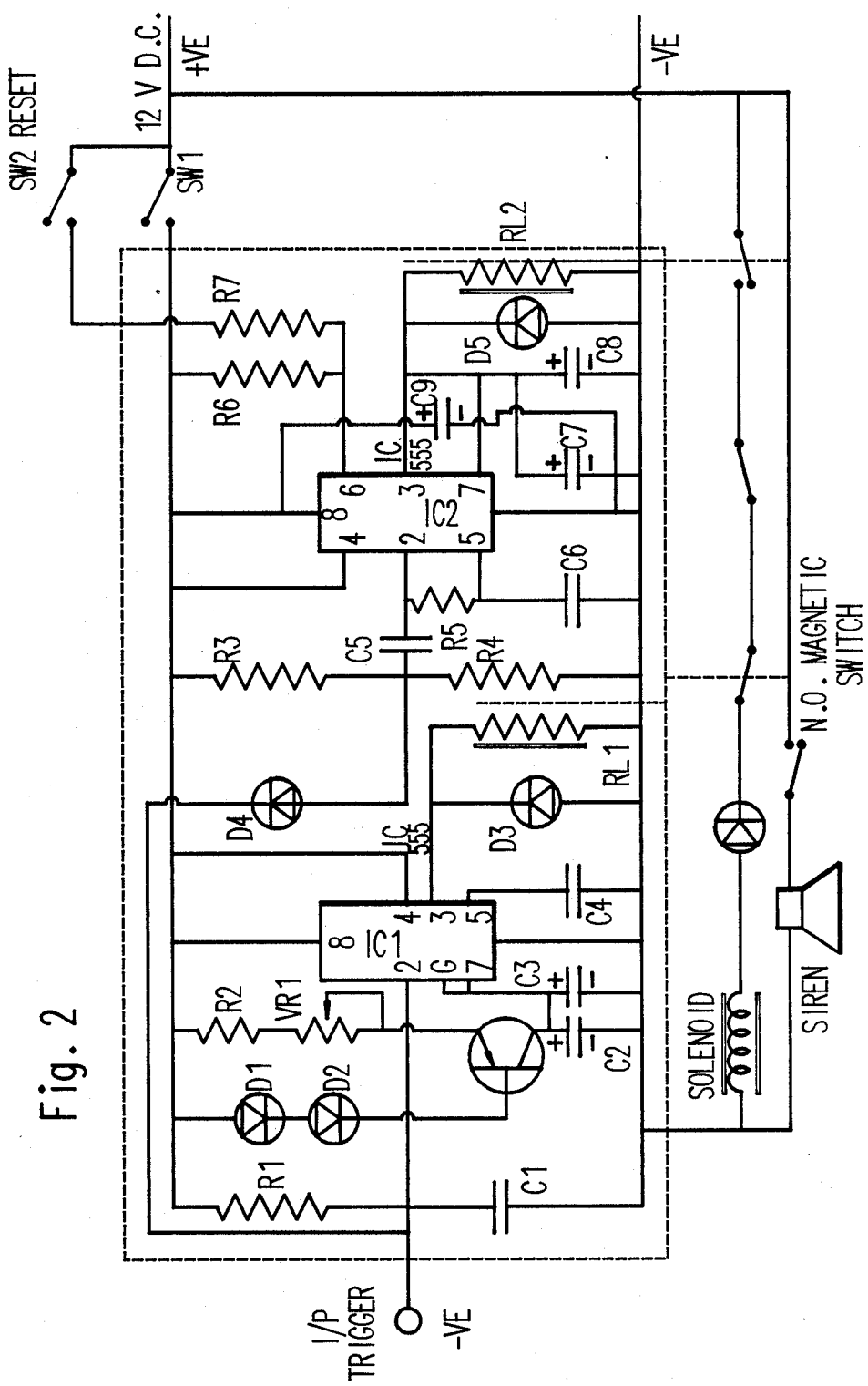
FIG. 2 is a circuit diagram.

Firstly having regard to FIG. 1, the box referenced 1 represents an existing alarm system of a motor vehicle to which the inventive device is fitted; this alarm system is wired to operate a timer represented by box 2. At the termination of a pre-set time period, existing alarm system 1 having detected the unlawful presence of a person in the motor vehicle, a solenoid operated relay represented by box 3 — aptly termed the "firing box" — opens a plunger valve of pressurized container so as to enable the contained substance to be released therefrom and discharged under pressure through concealed nozzle means referenced at 4.

Power to operate the relay is provided by the active bar of the vehicle's own fuse panel so that, even with the existing alarm device disabled, the inventive system will complete its operating cycle and release the deterrent substance. The so-discharged substance — as a so-called "atomised" spray — rapidly fills the interior of the vehicle to thereby cause much unbearable discomfort to the intruder who will immediately seek to vacate the vehicle as soon as possible.

The timing device of box 2 is a two-stage circuit timer which also activates a secondary system represented by the "back-up" box 5 to thereby cause speaker 6 to emit a high-pitched sound which is extremely painful to the human ear, thus further adding to the discomfort of the intruder.

Furthermore, in a motor vehicle in which is installed a radio or other sound system, this system is fitted with a proximity magnetic switch which is activated by even partial removal of the said system, allowing 12 V. D.C. to immediately energize the solenoid and the loudspeaker or siren. When the radio or other sound system is replaced in its correct position, the alarm is automatically reset.

Referring to the circuit diagram, operation is as follows: the door switches, or the existing alarm triggering mechanism, triggers IC1 +IC2 on the closing of relays RL1 +RL2. This allows 12 V. D.C. from the main fuse bar to pass through RL2 to the normally-closed contact of RL1.

The IC1 timer is set for a delay of from 30 to 60 seconds to permit resetting if accidently triggered. When the IC1 delay time has elapsed, it switches off, allowing the 12 V. D.C. to energize the solenoid and loudspeaker. Timer IC2 is set for approximately 4 minutes by fixed components R6, C7 and C8. When IC2 switches off the 12 V. D.C. is removed from the solenoid and the loudspeaker or siren and the circuit resets to deal with further attempts. In the event of accidental triggering-off, resetting is by means of SW2 or by the reset trigger of the existing alarm.

Turning finally to FIG. 3, the components are accommodated in a tamper-proof metal housing 7 which is able to be mounted upon the firewall of the motor vehicle via the fastening points 8. Ideally, the pressurized container is a steel cylinder 9, tested to 250 bars, and perhaps 300 mm long and, say, 50 mm in diameter.

Cylinder 9 is affixed to housing 7 — with its valve projecting into the latter — via a bracket 10 and a hose-clamp 11.

Within housing 7, the circuitry is contained in the box 12 and to cylinder valve 14 is fitted a plunger/reducer fitment 15. The solenoid is represented at 16 and the associated valve 17 has screwed into it an elbow 18, through which the substance is discharged to a hose 19 and in turn to the nozzle means 4 (see FIG. 1). Preferably, the solenoid valve is of brass construction, 12 V. D.C., 0–100 psi nominal.

The inventive unit is capable of being recharged simply and rapidly; furthermore, it is also able to reset in the event of accidental triggering-off.

From the abovegoing, it will be appreciated by those skilled in the art that numerous modifications and variations may be made to the invention without departing from the spirit and scope thereof as set out in the following claims.

I claim:

1. A motor vehicle theft deterrent device for use in a vehicle having an existing electrical vehicle alarm and a sound system component, comprising:
    a pressurized cylinder filled with a discomfort causing substance;
    a valve for selectively releasing said substance from said cylinder;
    a solenoid operatively connected for actuating said valve;
    distribution nozzle means connected to said valve for distributing said substance within a vehicle to deter an intruder;
    a two-stage timer operatively connected for actuation by said existing vehicle alarm to count first and second predetermined time periods;
    an audible alarm operatively connected for actuation by said timer;
    relay means operative upon expiration of said first predetermined time period for energizing said solenoid to open said valve, causing release of said substance from said cylinder and simultaneously activate said audible alarm;
    said relay means operative to de-energize said solenoid upon expiration of said second predetermined time period to close said valve and stop release of said substance from said cylinder and simultaneously deactivate said audible alarm;
    a magnetic proximity switch disposed adjacent said sound system component, said magnetic proximity switch operably connected to energize said solenoid and audible alarm upon movement of said sound system component, causing immediate release of said substance from said cylinder; and
    reset switch means operative to disable said two-stage timer prior to expiration of said first predetermined time period.

2. The device of claim 1, wherein said substance is a fluid capable of irritating the respiratory system, the eyes or both.

3. The device of claim 1, wherein said substance is non-toxic and non-corrosive.

4. The device of claim 1, wherein said substance comprises an indelible dyestuff.

5. The device of claim 1, wherein said pressurized cylinder, said valve and said solenoid are disposed in a tamper-proof metal housing mounted on the firewall of the vehicle.

6. The device of claim 1, wherein said distribution nozzle means comprises a plurality of nozzles concealed within the vehicle.

7. A motor vehicle theft deterrent device for use in a vehicle having an existing electrical vehicle alarm, a firewall and a sound system component, comprising:
    a tamper-proof metal housing mounted on the firewall of the vehicle;
    a pressurized cylinder filled with a discomfort causing substance disposed in said housing;
    a valve in said housing for selectively releasing said substance from said cylinder;
    a solenoid in said housing operatively connected for actuating said valve;
    distribution nozzle means connected to said valve for distributing said substance within the vehicle to deter an intruder;
    a two-stage timer in said housing and operatively connected for actuation by said existing vehicle alarm to count first and second predetermined time periods;
    an audible alarm operatively connected for actuation by said timer;
    relay means in said housing operative upon expiration of said first predetermined time period for energizing said solenoid to open said valve, causing release of said substance from said cylinder and simultaneously activate said audible alarm;
    said relay means operative to de-energize said solenoid upon expiration of said second predetermined time period to close said valve and stop release of said substance from said cylinder and simultaneously deactivate said audible alarm;
    a magnetic proximity switch disposed adjacent said sound system component, said magnetic proximity switch operably connected to energize said solenoid and audible alarm upon movement of said sound system component, causing immediate release of said substance from said cylinder; and
    reset switch means operative to disable said two-stage timer prior to expiration of said first predetermined time period.

* * * * *